United States Patent [19]

Nakagoshi et al.

[11] Patent Number: 4,722,970

[45] Date of Patent: Feb. 2, 1988

[54] ORIENTED POLYOLEFIN FILM

[75] Inventors: Nobuyuki Nakagoshi, Kudamatsu; Iwao Fuzikawa, Otsu; Mitsuo Kushino, Minoo; Shigeo Sadahiro, Tokuyama, all of Japan

[73] Assignees: Tokuyama Soda Co., Ltd.; Nippon Shokubai Kagaku Kogyo Co., Ltd., both of Japan

[21] Appl. No.: 896,339

[22] Filed: Aug. 13, 1986

[30] Foreign Application Priority Data

Aug. 14, 1985 [JP] Japan ................... 60-177643

[51] Int. Cl.$^4$ ............................................. C08L 61/00
[52] U.S. Cl. .................................................... 525/164
[58] Field of Search ................. 525/164; 523/201, 208

[56] References Cited

U.S. PATENT DOCUMENTS 3,945,980  3/1976  Tsubakimoto et al. ......... 524/598 X
4,267,285  5/1981  Broutman ....................... 525/164 X

FOREIGN PATENT DOCUMENTS 29159  12/1968  Japan .
59878   6/1974  Japan .

Primary Examiner—Theodore E. Pertilla
Attorney, Agent, or Firm—Lowe, Price, LeBlanc, Becker & Shur

[57] ABSTRACT

An oriented polyolefin film containing particles of a condensated resin comprising, as a structural unit, a compound having a triazine ring with an average particle size of 0.5 to 10 μm are contained at a ratio of 0.01 to 0.1% by weight based on a polyolefin and oriented monoaxially or biaxially by a factor of at least 4 in the orienting directions.

11 Claims, No Drawings

ORIENTED POLYOLEFIN FILM

BACKGROUND OF THE INVENTION

1. Field of the Invention

This invention concerns an oriented polyolefin film having excellent blocking-resistance, favorable transparency and high strength. More specifically, this invention relates to an oriented polyolefin film which contains particles of a condensated resin with an average particle size of 0.5 to 10 μm comprising a compound having a triazine ring as a structural unit in an amount of 0.01 to 0.1% by weight based on the polyolefin and which is oriented monoaxially or biaxially by a factor of at least 4 in the orienting directions.

2. Description of the Prior Art

Polyolefin films, particularly oriented polyolefin films, are mainly used as packaging materials for food stuffs or other like substances. However, the oriented poloyolefin films have a major drawback in that they tend to cause blocking and thereby significantly reduce manageability for packaging and other like operations.

In view of the above, means for preventing the blocking in the films that have hitherto been employed have included such techniques as blending fine inorganic silica or talc powder, etc., with the polyolefin to formulate a polyolefin composition, which is then molded during melting to obtain polyolefin film. However, a great amount of inorganic powder has to be mixed in order to provide a polyolefin composition with a satisfactorily high blocking resistance. On the other hand, the polyolefin composition in admixture with a great amount of fine inorganic powder has the defect that it lacks strength when formed into oriented films. Further, voids are formed at the periphery of the inorganic powder when the polyolefin films are oriented. These voids reduce the transparency of the oriented films and, thereby, noticeably impair the commercial value of the films as a packaging material.

In order to overcome the foregoing drawbacks, a method of blending fine polyamide powder instead of the fine inorganic powder has been proposed. Blending of the fine polyamide powder can indeed prevent the reduction in the transparency of the resulting polyolefin films. However, it is again necessary to blend a great amount of fine polyamide powder in order to provide the resultant polyolefin films with a sufficient blocking resistance, which leads to unsatifactory physical properties such as reduction in the strength of the polyolefin films. Moreover, since this increases the film cost and causes an economical disadvantage, no general industrial application thereof has yet been achieved.

SUMMARY OF THE INVENTION

One object of this invention is to provide an oriented polyolefin film that is free from noticeable reductions in the physical properties such as transparency and strength and yet has excellent blocking resistance.

Another object of this invention is to provide an oriented polyolefin film having an excellent blocking resistance with a small amount of fillers blended therein.

The foregoing object of this invention can be attained by an oriented polyolefin film which contains particles of a condensated resin with an average particle size of 0.5 to 10 μm comprising a compound having a triazine-ring as its structural unit in an amount of 0.01 to 0.1 percent by weight based on the polyolefin and which is oriented monoaxially or biaxially by a factor of at least 4 in the orienting directions.

DETAILED DESCRIPTION OF THE INVENTION

Condensated Resin

The condensated resin used in this invention comprises a compound having a triazine ring as one ingredient for at least one of the monomers constituting the condensated resin. Various monomers having the triazine ring are known and these known monomers are usable in this invention with no particular restriction. Specific examples of the monomers used preferably can include cyanuric acid; alkyl esters thereof with 1 to 20 carbon atoms; aryl esters thereof such as of benzyl or naphthyl; melamine, guanamine; guanamine derivatives such as acetoguanamine, benzoguanamine and spiroguanamine that is, 3,9-bis [2-(3,5-diamino-2,4,6-triazaphenyl)ethyl]2,4,8,10-tetraxaspiro(5,5)undecane. Particularly, those compounds having at least one amino group attached to the triazine ring, for example, melamine, guanamine and guanamine derivatives are preferred monomers for attaining the purpose of this invention.

The desired condensated resin can be obtained by conducting a condensating reaction between a monomer having a triazine ring, as described above and another condensatable monomer to be described later. Other monomers such as aniline, phenol and cresol can also be used.

The monomer for effecting the condensating reaction with the monomer having the triazine ring described above, generally includes aldehydes such as formaldehyde and acetoaldehyde, but a difunctional compound such as diamino ethane, dichloroethane, glycine and oxalic acid can also be used depending on the kind of monomer having the triazine ring. The combination for each of the monomers for obtaining the condensated resin can easily be selected by those skilled in the art. However, various physical properties of the oriented polyolefin film, that is, the object of this invention are dependent on the content of the monomer having the triazine ring contained in the condensated resin. In view of the above, it is desired that the structural unit of the compound having the triazine ring contained in the condensated resin is, preferably, from 25 to 90% by weight and, more preferably, 50 to 85% by weight.

Further, the amount of the other monomer for effecting the condensating reaction contained in the condensated resin, that is, the structural unit of the aldehydes or difunctional compound is selected within a range, preferably, of 75 to 10% by weight and, more preferably, 50 to 15% by weight. Further, the monomers that can be present together in the condensating reaction such as aniline, phenol and cresol, can be used within a range of 0 to 50% by weight, preferably, 0 to 25% by weight in the monomer having the triazine ring as the substitute therefor. In this specification, the ratio of the structural unit for each of the compounds means the ratio of each starting compound used upon preparing the condensated resin based on the total amount of the starting compounds.

As has been described above, the condensated resin particularly preferred in this invention includes those condensated polymers comprising a compound having at least one amino group attached to the triazine ring as one of the ingredients of the monomer. Among others, melamine, guanamine and the derivatives thereof are suitable. For instance, melamine-formaldehyde resin, benzoguanamineformaldehyde resin and benzoguanamine-melamine-formaldehyde resin are particularly preferred.

Upon preparing a polyolefin film from the polyolefin composition in which the particles of the condensated resin are blended with the polyolefin, odors may sometime be generated depending on the kind and the amount of the condensated resin added. In such a case, the problem of the odor can be completely overcome by using the melaminecontaining condensated resin as one of the ingredients in the condensated resin. The desired amount of melamine contained in the melamine-containing condensated resin falls within a range of 80/20 to 0/100 and, preferably, from 60/40 to 20/80 expressed by the weight ratio of the monomer having the triazine ring other than the melamine, for example, benzoguanamine based on melamine.

Average Particle Size

The particles of the condensated resin used in this invention should be fine particles having an average particle size of 0.5 to 10 μm and, preferably, of 1 to 4 μm. If the average particle size of the condensated resin particles is less than 0.5 μm, blocking resistance of the obtained oriented polyolefin film is insufficient. Accordingly, a great amount of addition is necessary in order to obtain sufficient blocking resistance which, however, undesirably leads to a reduction in the transparency and the strength of the oriented polyolefin film. While on the other hand, if the average particle size is greater than 10 μm, the transparency of the obtained oriented polyolefin film is reduced and fails to attain the intended purpose of the invention.

Since the particles of the condensated resin having the particle sizes as described above cannot be obtained by physical means such as pulverization, they are generally prepared by effecting the condensating reaction in a suspended or emulsified reaction system while undergoing stirring, and the configuration of the particles is substantially spherical. It may be considered that such a spherical shape of the particles of the condensated resin in this invention can suitably contribute to the increase in the blocking resistance and thereby prevent the reduction in transparency of the oriented polyolefin.

Method of Preparing Particles of Condensated Resin

There are no particular restrictions on the method of preparing the condensated resin used in this invention and any of the known-methods can be employed. Typical production processes suitably employed in general are described below.

The condensated resin particles described above can be obtained, generally, by conducting condensation polymerization while dispersing or emulsifying the monomers in a suitable medium, or by a so-called precipitation polymerization, in which the monomers are dissolved in a solvent and condensated resin are deposited through condensation polymerization. A production process for such fine spherical particles is specifically described, for example, in U.S. Pat. No. 3,945,980 as below.

A process for preparing a suspension of a finely divided hardened resin which comprises, in combination, the steps of reacting in an aqueous medium at a pH of 5-10 a member selected from the group consisting of benzoguanamine and a mixture of 100-50% by weight of benzoguanamine and 0-50% by weight of melamine with formaldehyde in a ratio of 1 mole of the former to 1.2-3.5 moles of the latter to prepare an aqueous liquid of a soluble and fusible resin having a degree of modified water tolerance of 0 to 150%, introducing this aqueous liquid to an aqueous solution of protective colloid with stirring to prepare an emulsion of a soluble and fusible resin, adding a curing catalyst to said emulsion, followed by holding same for at least one hour at a temperature in the range of 40°-60° C., and thereafter heating the emulsion at a temperature in the range of 60°-200° C. under normal atmospheric or superatmospheric pressure to effect the hardening of the resin.

Further, as a production process for such fine spherical particles, the method described in Japanese Patent Publication No. 29159/1968 can also be mentioned. That is, an aqueous solution of melamine and formaldehyde or an aqueous solution of a precondensate of melamine and formaldehyde is reacted under the presence of a protective colloid within a pH range of 6.0 to 8.0 untill a solid phase is formed.

The fine spherical particles obtained by the said production processes have an extremely sharp particle size distribution, through which the blocking resistance and the strength of the resulting polyolefin film can be further improved.

Polyolefin

The film substrate used in this invention is polyolefin. The polyolefin is a homopolymer of α-olefins such as ethylene, propylene and butylene; a copolymer of these α-olefins, for example, random copolymer and block copolymer; or a mixture thereof. Propylene homopolymer and copolymer are used particularly preferable. These polyolefins are general-purpose resins used broadly and these known resins can also be used in this invention with no particular restrictions.

Ratio of the Condensated Resin Particles

The particles of the condensated resin contained in the oriented polyolefin film in this invention should be selected within a range of 0.01 to 0.1% by weight and, preferably, 0.02 to 0.05% by weight based on the polyolefin. If the added amount of the particles of the condensated resin is less than 0.01% by weight, the blocking resistance of the resultant oriented polyolefin film is insufficient. While on the other hand, if it is greater than 0.1% by weight, the transparency and the strength of the resultant oriented polyolefin film are reduced failing to attain the purpose of this invention.

Oriented Polyolefin Film

There are no particular restrictions on the means for obtaining the oriented polyolefin film according to this invention and any of known means can be employed. Preferred methods generally employed are exemplified below.

The polyolefin and the particles of the condensated resin are mixed in a mixer, for example, a melting mixer such as an extruder, pelletizer or high speed twin shaft mixer, to extrude the polyolefin composition in a cylindrical form, which is cut after cooling into a pellet-shaped product. The pellet-shaped product is then melted again and extruded into a film-like shape through a die such as an inflation die or a T-die, cooled and finally oriented under heating to obtain an aimed oriented polyolefin film.

It is extremely important that the oriented polyolefin film according to this invention is oriented monoaxially or biaxially by a factor of at least 4 or, preferably, at least 5 in the orienting directions. Orientation by the factors as described above can provide the film with high strength and also high blocking resistance. The phenomenon of providing such remarkably advantageous effects by orienting is characteristic to this invention and it can not be found in any other cases, for instance, where fine inorganic or polyamide powder is used as the filler, or where polymers other than the polyolefin are used as the film substrate. Accordingly, it can be considered as an extraordinary phenomenon that the oriented polyolefin film according to this invention exhibits such an excellent blocking resistance by merely blending a small amount of particles of the specific condensated resin. Particularly, those polyolefin films according to this invention oriented in biaxial directions by the factor of at least 4 in the orienting directions show an extremely high blocking resistance and can be used most suitably.

ADVANTAGE OF THE INVENTION

Although the mechanisms by which the oriented polyolefin film according to this invention can provide the foregoing advantageous effects have not completely become apparent at present, they are assumed by the present inventors to be as follows:

That is, since the filler used in this invention is a fine powder of a specific condensated resin and, particularly, it is in a spherical form, when the film prepared from the polyolefin composition blended with such a filler is oriented, no voids occur at the periphery of the filler. Further, since the filler has low affinity with the polyolefin, it is extruded to the surface layer of the film upon orientation and the density of the filler is higher at the surface than inside of the film.

In the oriented polyolefin film according to this invention, other known additives can be added within such an extent as to not give adverse effects to this invention. Typical examples of these additives include various kinds of stabilizers such as anti-oxidants and UV-ray absorbers; nucleating agents, antistatic agents; and pigments. Since different physical properties are required for the oriented polyolefin films according to this invention depending on their applications, the inorganic filler described above can also be blended as required.

As can be understood from the foregoing explanations, the oriented polyolefin films according to this invention exhibit an excellent blocking resistance and are free from substantial reduction in the transparency and strength. Moreover, the drawback often experienced in the use of conventional anti-blocking agents that the film surfaces are damaged due to the friction between films can be completely overcome by this invention.

EMBODIMENT OF THE INVENTION

This invention will now be described more specifically referring to examples, but this invention is in no way limited only to these examples. "Parts" and "percent" used in these examples are "parts by weight" and "percent by weight" unless otherwise specified.

Various tests in the examples and comparative examples were carried out by the following methods:

(1) Haze (%)

Haze was measured according to JIS K 6714 by using a hazemeter (manufactured by Suga Shikenki Co., Ltd.).

(2) Dynamic Friction Coefficient

One of two overlaid film specimens each with a 50 mm lateral size was caused to slide at a frictional speed of 35 mm/min under a load of 200 g to measure the resistance value (g), and the friction coefficient was determined in accordance with the equation described below. The resistance value was measured by using a sliding tester manufactured by Toyo Seiki.

$$\text{Dynamic friction coefficient} = \frac{\text{resistance value (g)}}{200 \text{ g}}$$

(3) Blocking Strength (g/cm$^2$)

Two sheets of film specimens each 120 mm × 120 mm in size were overlaid and left for 24 hours in an atmosphere of 40° C. and 90% RH under a load of 73 g/cm$^2$ and samples were cut out so as to provide 12 cm$^2$ areas for the blocking portions. The peeling strength under shearing (g) was measured by an autograph and the blocking strength was determined by the following equation:

$$\text{Blocking strength} = \frac{\text{Peeling strength under shearing (g)}}{12 \text{ cm}^2}$$

(4) Tensile Modulus (Kg/mm$^2$)

The tensile modulus was measured according to ASTM D-882.

(5) Particle size distribution

The particle size distribution was determined by the Coulter-Counter method.

The particle size distribution was shown by the range of particle sizes (μm) occupying more than 95% by weight of the specimen.

(6) Average particle size

Average particle sizes was determined by the Coulter-Counter method.

Fine Spherical Particles and Preparation Thereof

Fine spherical particles prepared by the following (A) and (B) production were used.

(A) Preparation of benzoguanamine-formaldehyde resin

Into a four-necked flask equipped with a stirrer, a reflux condenser and a thermometer, 150 part of benzoguanamine, 130 parts of 37% formalin and 0.52 parts of an aqueous 10% solution of sodium carbonate were charged and mixed and the pH value of the resulting mixture was adjusted to 8.0. The mixture was warmed to 95° C. while undergoing stirring and was reacted for 4 hours to obtain a soluble, fusible resin.

Separately, 8 parts of Kuraraypoval 205 (trade name of polyvinyl alcohol, manufactured by Kuraray Co., Ltd.) was dissolved in 750 parts of water and the aqueous solution was warmed to 90° C. and stirred by using a homogenizer (manufactured by Tokushu Kikakou Co., Ltd.).

The soluble, fusible resin was charged into the aqueous solution of Kuraraypoval 205 undergoing stirring to obtain a white emulsion. The emulsion was cooled to 40° C., and 2 parts of dodecyl benzene sulfonic acid was added. It was then kept for 2 hours at a temperature of 40° C. while being moderately stirred by an anchor type stirrer. Next, the mixture was stirred for 2 hours each at temperatures of 50° C., 60° C. and 90° C., respectively, to obtain a liquid suspension of a fine hardened resin. Finally, the fine hardened resin was filtered out from the liquid suspension and washed with water. The resulting filter cake was heated at 150° C. for 5 hours to obtain a fine hardened resin.

Three types of fine hardened resins were obtained by adjusting the rate of rotations of the homogenizer under observation of an optical microscope during stirring such that the resultant emulsion particles had a predetermined particle size.

The shape and the particle size of the thus obtained three kinds of fine hardened resins were examined by a scanning type electronic microscope and also by the Coulter-Counter method. It was determined that they were fine, spherical particles (A-1, A-2 and A-3) having the average particle sizes and the particle size distributions shown in Table 1.

TABLE 1

| Kinds of fine hardened resin | Average particle size (μm) | Particle size distributions (μm) |
|---|---|---|
| A-1 | 3.3 | 1–7 |
| A-2 | 7.0 | 2.5–20 |
| A-3 | 15.0 | 5–40 |

(B) Preparation of Benzoguanamine-Melamine-Formaldehyde Resin

Into the same four-necked flask used in (A) above, 100 parts of benzoguanamine, 100 parts of melamine, 279 parts of 37% formalin and 1.12 parts of an aqueous 10% solution of sodium carbonate were charged and mixed and the pH of the resulting mixture was adjusted to 8.0. The mixture was warmed to 95° C. while undergoing stirring and was reacted for 3 hours to obtain a soluble, fusible resin.

Separately, 12 parts of Kuraraypoval 117 (trade name of polyvinyl alcohol, manufactured by Kuraray Co. Ltd.) was dissolved in 800 parts of water and the aqueous solution was warmed to 80° C. and stirred with a homogenizer. The soluble, fusible resin was poured into the aqueous solution of Kuraraypoval 117 undergoing stirring to obtain a white emulsion. The emulsion was cooled to 40° C. then, 3 parts of paratoluene sulfonic acid was added, and the mixture was kept for 1.5 hours at a temperature of 50° C. while being moderately stirred with an anchor type stirrer. Next, the mixture was kept for 2 hours each at temperatures of 60° C., 70° C. and 90° C., respectively, and to obtain a liquid suspension of fine hardened resin. The fine hardened resin was finally filtered out from the liquid suspension and washed with water. The resulting filter cake was heated at 150° C. for 5 hours to obtain a fine hardened resin.

Three kinds of fine hardened resins were obtained by adjusting the rate of rotations of the homogenizer in the same manner as in (A) described above during stirring with the homogenizer.

The shape and size of the particles in the three kinds of fine hardened resins obtained by the foregoing process were examined with a scanning type electron microscope and by the Coulter-Counter method. It was found that they were fine spherical particles (B-1, B-2 and B-3) having the average particle sizes and the particle size distributions shown in Table 2.

TABLE 2

| Kinds of fine hardened resin | Average particle size (μm) | Particle size distributions (μm) |
|---|---|---|
| B-1 | 1.2 | 0.2–2.5 |
| B-2 | 3.0 | 1–7 |
| B-3 | 6.0 | 2–10 |

EXAMPLES 1–11, COMPARATIVE EXAMPLES 1–5

Polypropylene (melt flow index (MI)=2 g/10 min., heptane soluble content 3%), ethylene-propylene random copolymer (P-E random copolymer : MI=7 g/10 min, heptane soluble content 35%, ethylene content 0.5 wt %) and low density polyethylene ("Mirason", trade name of products, manufactured by Mitsui Polychemical Co.) were used respectively as the polyolefins. After mixing the fine hardened resins, shown in Table 3, with the polyelefins at predetermined ratios by using a Henkel mixer, the blends were extruded on a sheet and oriented by the factors shown in Table 3 under the conditions of longitudinal orienting temperature at 140° C. and transversal orienting temperature at 175° C. to obtain oriented polyolefin films. Then, a corona discharge treatment was applied on one surface of each of the oriented polyolefin films.

Thickness, haze, blocking strength, dynamic friction coefficient and tensile modulus were measured for the resultant polyolefin films. The results are collectively shown in Table 3. The blocking strength and the dynamic friction coefficient were measured on the surfaces with and without corona discharge treatment.

From the results shown in Table 3, it is apparent that the oriented polyolefin films according to this invention, that is, those films prepared by orienting, under the specified orienting conditions, those polyolefins having a predetermined average particle size and containing a specific amount of particles of the condensated type resin having the structural unit comprising the compound that includes a triazine ring are excellent in blocking resistance, as well as in various other properties.

TABLE 3

| Poly-olefin | Example Comparative Example | Fine hardened Resin | Blended amount wt % | Orienting factor longitudinal | Orienting factor transversed | Thickness (μm) | Haze % | Blocking strength g/cm² untreated surface | Blocking strength g/cm² treated surface | Dynamic friction coefficient untreated surface | Dynamic friction coefficient treated surface | Tensile modulus kg/mm² longitudinal | Tensile modulus kg/mm² transversal | (note) odor |
|---|---|---|---|---|---|---|---|---|---|---|---|---|---|---|
| Poly-propy-lene | Example 1 | A-1 | 0.05 | 5 | 9 | 20 | 1.8 | 29 | 10> | 0.28 | 0.27 | 181 | 325 | |
| | Example 2 | " | 0.08 | 5 | 9 | 20 | 3.3 | 10> | 10> | 0.29 | 0.28 | 175 | 335 | Δ |
| | Example 3 | A-2 | 0.05 | 5 | 9 | 20 | 1.5 | 10> | 10> | 0.35 | 0.27 | 179 | 321 | |
| | Example 4 | " | 0.08 | 5 | 9 | 20 | 2.8 | 10> | 10> | 0.24 | 0.28 | 182 | 333 | Δ |
| | Example 5 | B-1 | 0.05 | 5 | 9 | 20 | 1.2 | 35 | 10> | 0.28 | 0.31 | 170 | 325 | |
| | Example 6 | " | 0.08 | 5 | 9 | 20 | 3.9 | 20 | 10> | 0.24 | 0.25 | 178 | 334 | |
| | Example 7 | B-2 | 0.05 | 5 | 9 | 20 | 2.0 | 32 | 10> | 0.21 | 0.29 | 176 | 331 | |

TABLE 3-continued

| Poly-olefin | Example Comparative Example | Fine hardened Resin | Blended amount wt % | Orienting factor longi-tudinal | Orienting factor trans-versed | Thick-ness (μm) | Haze % | Blocking strength g/cm² treated surface | Blocking strength g/cm² un-treated surface | Dynamic friction coefficient treated surface | Dynamic friction coefficient un-treated surface | Tensile modulus kg/mm² longi-tudinal | Tensile modulus kg/mm² trans-versal | (note) odor |
|---|---|---|---|---|---|---|---|---|---|---|---|---|---|---|
| | Example 8 | " | 0.08 | 5 | 9 | 20 | 3.4 | 19 | 10> | 0.18 | 0.23 | 182 | 345 | |
| | Example 9 | B-3 | 0.06 | 5 | 9 | 30 | 3.4 | 10> | 10> | 0.22 | 0.25 | 182 | 353 | |
| | Comparative Example 1 | B-2 | 0.25 | 5 | 9 | 20 | 7.8 | 10> | 10> | 0.18 | 0.23 | 168 | 315 | |
| | Comparative Example 2 | A-1 | 0.08 | — | — | 25 | 7.3 | 74 | 35 | 0.34 | 0.20 | 47 | 45 | Δ |
| | Comparative Example 3 | A-2 | 0.08 | — | — | 25 | 6.5 | 58 | 29 | 0.30 | 0.18 | 45 | 48 | Δ |
| | Comparative Example 4 | A-3 | 0.08 | 5 | 9 | 20 | 5.7 | 56 | 19 | 0.30 | 0.36 | 178 | 322 | Δ |
| | Comparative Example 5 | B-2 | 0.08 | 3 | 3 | 20 | 5.4 | 56 | 34 | 0.31 | 0.18 | 104 | 107 | |
| P-E random copolymer | Example 10 | B-2 | 0.05 | 5 | 9 | 20 | 3.7 | 29 | 10> | 0.25 | 0.27 | 191 | 357 | |
| LDPE | Example 11 | B-2 | 0.05 | 5 | 9 | 20 | 5.4 | 52 | 10> | 0.27 | 0.31 | 165 | 310 | |

: odorless upon film molding
Δ: odor noticed upon film molding
X: strong odor upon film molding

COMPARATIVE EXAMPLES 6-7

These oriented polyolefin films were obtained under the same conditions as in Example 8 excepting that nylon 12 of an average particle size shown in Table 4 was used instead of the fine hardened resin and that the particles were added in the amounts shown in Table 4. Thickness, haze, blocking strength, dynamic friction coefficient and tensile modulus for the resultant oriented polyolefin films were measured. The results are shown in Table 4.

From the results shown in Tables 4 and 3, it is apparent that the oriented polyolefin films according to this invention are more excellent in the blocking resistance, as well as in the various other properties, than the comparative examples that used the particles of nylon 12 as the anti-blocking agent.

TABLE 4

| Comparative Example | Particle size μm | Addition amount wt % | Orienting factor longi-tudinal | Orienting factor trans-versal | Thick-ness μm | Haze % | Blocking strength g/cm² treated surface | Blocking strength g/cm² un-treated surface | Dynamic friction coefficient treated surface | Dynamic friction coefficient un-treated surface | Tensile modulus Kg/mm² longi-tudinal | Tensile modulus Kg/mm² trans-versal |
|---|---|---|---|---|---|---|---|---|---|---|---|---|
| 6 | 3.0 | 0.05 | 5 | 9 | 20 | 0.9 | 112 | 51 | 0.43 | 0.48 | 165 | 308 |
| 7 | 3.0 | 1.0 | 5 | 9 | 20 | 5.2 | 58 | 10 | 0.38 | 0.43 | 142 | 265 |

What is claimed is:

1. An oriented polyolefin film which contains particles of a condensated resin as a filler, said resin comprising, a compound having a triazine ring as a structural unit, said resin having an average particle size of 0.5 to 10 μm, and said resin being contained in said polyolefin film in an amount of 0.01 to 0.1% by weight based on the polyolefin and said polyolefin film being oriented monoaxially or biaxially by a factor of at least 4 in the orienting directions.

2. An oriented polyolefin film as defined in claim 1, wherein the triazine structural unit comprises from 25 to 90% by weight of the compound.

3. An oriented polyolefin film as defined in claim 1 or 2, wherein the condensated resin is prepared by a condensation reaction between the compound having the triazine ring and aldehydes.

4. An oriented polyolefin film as defined in claim 1, wherein the compound having the triazine ring has at least one amino group attached to the triazine ring.

5. An oriented polyolefin film as defined in any one of claims 1 to 4, wherein the compound having the triazine ring is selected from the group consisting of melamine and benzoguanamine.

6. An oriented polyolefin film as defined in claim 3, wherein the aldehyde is formaldehyde.

7. An oriented polyolefin film as defined in claim 1, wherein the condensated resin is melamine-formaldehyde resin or benzoguanamine-melamineformaldehyde resin.

8. An oriented polyolefin film as defined in claim 1, wherein the condensated resin is in a spherical form.

9. An oriented polyolefin film as defined in claim 1, wherein the polyolefin is a propylene homopolymer or a propylene copolymer.

10. An oriented polyolefin film as defined in claim 1, wherein the polyolefin is polyethylene.

11. An oriented polyolefin film as defined in claim 1, wherein the polyolefin film is oriented biaxially by a factor of at least 4 in the orienting directions.

* * * * *